March 2, 1971 W. D. DAVID ETAL 3,567,335
RESILIENT HUB ASSEMBLY AND METHOD OF MAKING SAME
Filed June 24, 1968 3 Sheets-Sheet 1

INVENTORS
WALTER D. DAVID
DONALD F. WHITE

BY
McCormick, Paulding & Huber
ATTORNEYS

March 2, 1971      W. D. DAVID ET AL      3,567,335
RESILIENT HUB ASSEMBLY AND METHOD OF MAKING SAME
Filed June 24, 1968      3 Sheets-Sheet 2

United States Patent Office 3,567,335
Patented Mar. 2, 1971

3,567,335
RESILIENT HUB ASSEMBLY AND METHOD OF MAKING SAME
Walter D. David, Torrington, Conn., and Donald F. White, Coram, N.Y., assignors to The Torrington Manufacturing Company, Torrington, Conn.
Filed June 24, 1968, Ser. No. 739,548
Int. Cl. B64c 11/04
U.S. Cl. 416—134                    4 Claims

ABSTRACT OF THE DISCLOSURE

An inexpensive resilient hub assembly for fans and blowers wherein radial member defining hub opening has six integral axially bent tabs extending alternately in one and opposite axial directions. A flexible hub is compressively secured within the tabs and may have a rigid hub compressively secured therewithin and attached to a shaft by a conventional set screw. The method comprises slitting the radial member adjacent a central opening and bending the tabs to axial positions, and entering the flexible hub therewithin for compressive retention. A Teflon reducing sleeve is employed in inserting the hub into the central opening of the radial member.

BACKGROUND OF THE INVENTION

Resilient hub assemblies find wide application in fans, blowers and other rotating units and a simple and inexpensive resilient hub assembly has long been sought in the fan and blower industry.

It is the general object of the present invention to provide a resilient hub assembly which is highly effective in the transmission of torque and yet provides the desired resilient connection and low cost characteristics both as to material expenditures and simplicity and economy of manufacturing method.

SUMMARY OF THE INVENTION

In fulfillment of the aforementioned object, a thin radial hub receiving member is provided with a central opening and with integral tabs which are bent to extend generally axially about the opening and to provide generally radially inwardly facing and generally axially extending hub seating surfaces. At least two such tabs are provided on generally opposite sides of a hub opening and, preferably, six tabs are provided and are bent alternately in one and opposite axial directions so as to provide three circumaxially spaced tabs on each side of the radial member. A flexible hub member is provided and is somewhat larger radially than the hub opening in the radial member and also has an axial dimension substantially in excess of the axial dimension of the said member. The hub member is compressed and entered in the hub opening and retained therein by compressive engagement with the seating surfaces. Sharp edges at free end portions of the tabs and at junctions between tab surfaces also compressively engage and assist in the positive retention of the hub in the hub opening.

In one embodiment, a second and rigid hub member is provided and is compressively retained within the flexible hub member. The rigid hub member as positive shaft securing means, preferably in the form of a conventional set screw and threaded opening and obviates the need for reliance on direct compressive engagement and attachment of the flexible hub to the shaft.

In accordance with one aspect of the method of the invention, a thin radial member is provided with radially extending slits adjacent a central opening whereby to define a plurality of tabs. The tabs are then bent through approximately 90° to the axial positions mentioned above where they provide hub seating surfaces of substantial axial dimension. After formation of the tabs, the flexible hub is compressed and inserted within the tabs for compressive engagement therewith and for torque transmitting retention within the hub opening.

In accordance with a second aspect of the method of the invention, a radial member is provided with a central hub opening and may or may not include the aforementioned integral tab construction. A flexible hub is provided and a hub compressing member has entry and exit openings and a reducing section therebetween. The wall of the reducing section has a low coefficient of friction at least approximately equal to that of a fluorocarbon thermoplastic. The hub, the hub compressing member, and the hub opening of the radial member are aligned axially and the hub is urged through the reducing section and into the hub opening of the radial member wherein it compressively engages the member and is positively retained therein.

The drawings show preferred embodiments of the invention and such embodiments will be described, but it will be understood that various changes may be made from the embodiments disclosed, and that the drawings and description are not to be construed as defining or limiting the scope of the invention, the claims forming a part of this specification being relied upon for that purpose.

DESCRIPTION OF THE PREFERRED EMBODIMENTS

Figure 1:
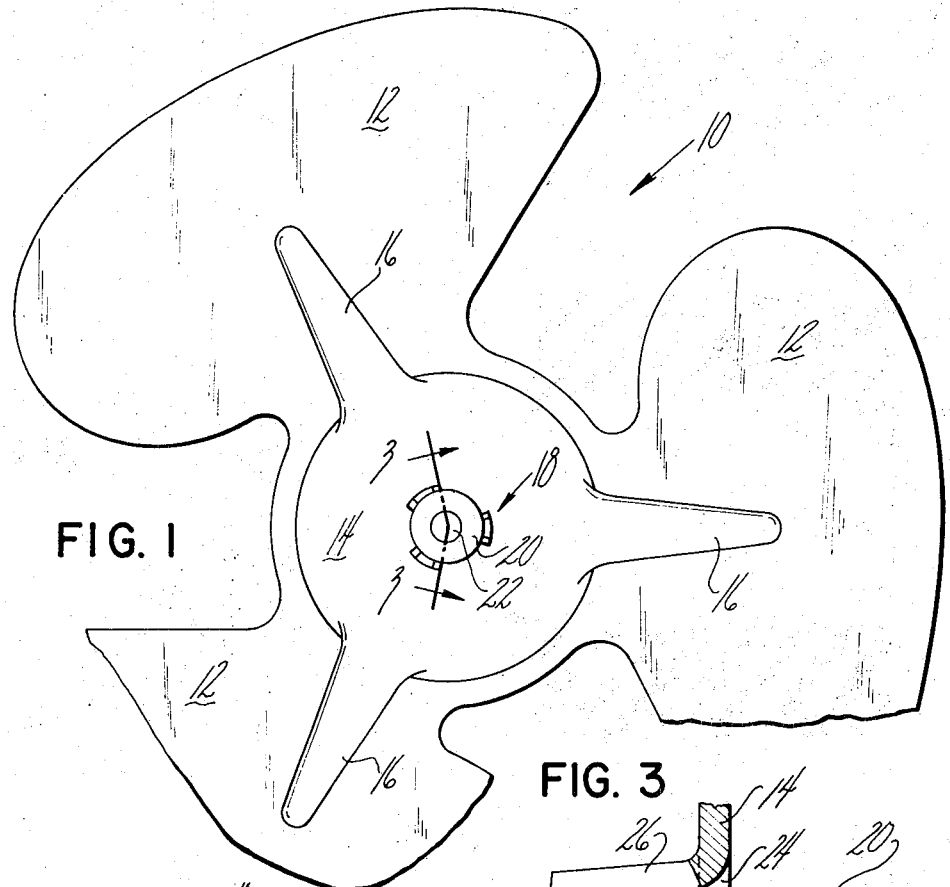
FIG. 1 is a fragmentary front view of an axial fan incorporating the resilient hub assembly of the present invention.
Figure 2:
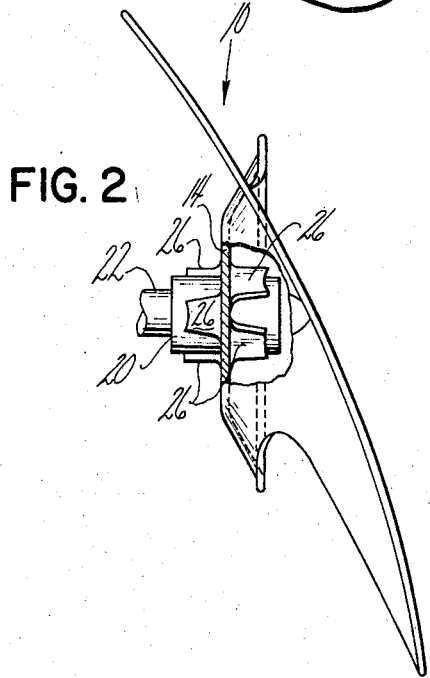
FIG. 2 is a side view partially in section showing the fan and resilient hub assembly of FIG. 1.

Referring particularly to FIGS. 1 and 2, it will be observed that an axial fan 10 has circumaxially arranged fluid moving blades 12, 12 arranged about a center section 14 which comprises an axially thin radially extending member. The radial member or center section 14 may be formed separately or may be integral with the fan blades 12, 12 in accordance with conventional practice. Strengthening ribs 16, 16 extend radially outwardly from the center section 14 along the blades 12, 12 in a conventional manner.

A resilient hub assembly constructed in accordance with the present invention is indicated generally at 18 and comprises a flexible hub 20 mounted on a splined shaft 22 and compressively engage therewith for torque transmitting retention thereon. The flexible hub 20 is preferably of rubber construction but a wide variety of other materials may be employed within the scope of the invention. The axial dimension of the hub is substantially greater than that of the radial member 14 and the radial dimension thereof is somewhat greater than a hub receiving opening in the member as will be seen hereinbelow. Smooth, knurled and other shaft configurations also fall within the scope of the invention.

Figure 3:
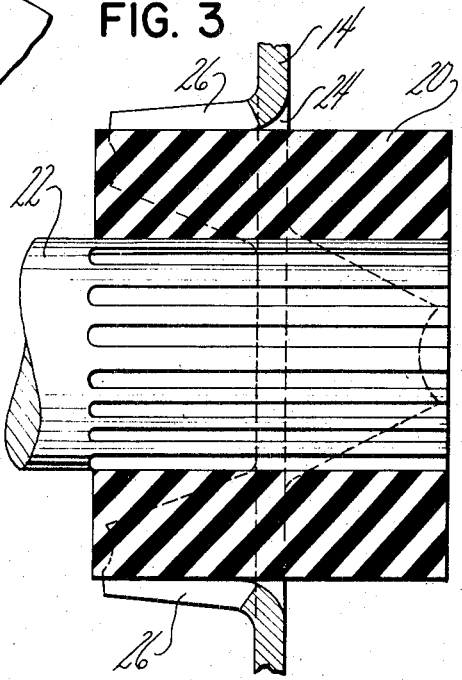
FIG. 3 is an enlarged generally axial section of the hub assembly taken generally as indicated at 3—3 in FIG. 1.

As best illustrated in FIGS. 2 and 3, the radial member 14 is adapted at a center section for connection with the hub or hub member 20 and is provided with a central hub receiving opening 24. As mentioned, a plurality of tabs are provided in order to form axially extending hub seating surfaces of substantial axial dimension. Six (6) integral tabs 26, 26 are preferably provided (five shown in FIG. 2) and each of said tabs extends generally axially outwardly from the radial member 14 so that its inner surface faces generally radially outwardly and extends generally axially as a hub seating surface. While the tabs 26, 26 are not precisely diametrically opposite each other with respect to the opening 24, it will be seen that they are at least generally opposite each other across the opening so as to engage and compressively retain the hub 20 within the opening. When two (2) tabs are provided to extend in one axial direction they may of course be arranged in precise diametrically opposite relationship across the opening 24.

Figure 6:
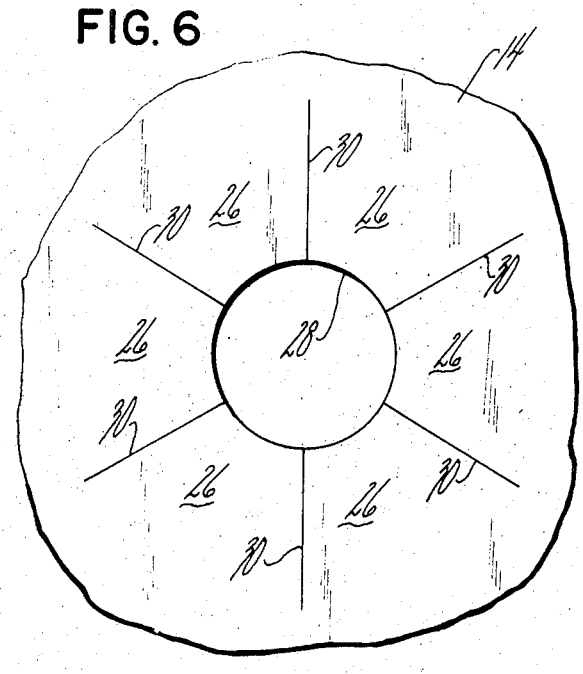
FIG. 6 is a fragmentary front view of a radial member, a central opening therein, and slits in the member defining tabs prior to a bending operation thereon.
Figure 7:
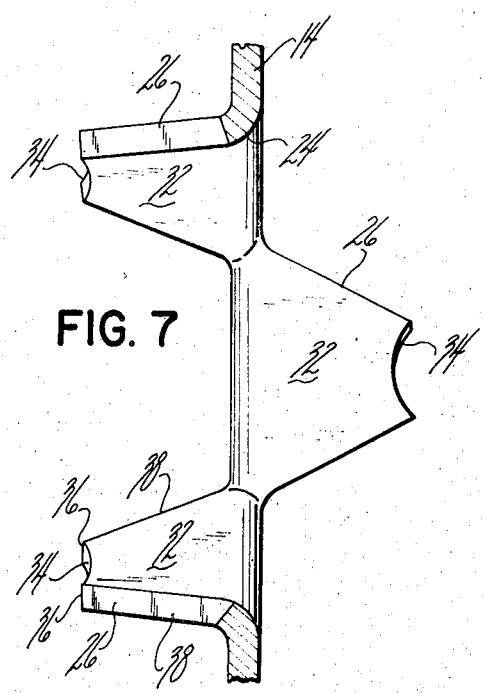
FIG. 7 is similar to FIG. 6 but shows the central opening and tabs in section and subsequent to a bending operation on the tabs.

Referring particularly to FIGS. 6 and 7, a first aspect of the method of the present invention will be readily understood to include the formation of a central blank opening 28 in a radial member such as 14. The opening 28 is preferably circular but may take other forms. A plurality of slits 30, 30 are also formed in the member 14 and extend generally radially outwardly in said member from the opening 28 whereby to define a plurality of circumaxial tabs 26, 26. Six (6) equally circumaxially spaced slits 30, 30 are shown in FIG. 6 and, in consequence, six (6) equally shaped and circumaxially spaced tabs 26, 26 are formed in the member 14. The tabs 26, 26 are bent alternately in one and opposite axial directions whereby to provide three generally axially extending tabs on each side of the radial member 14 and to define the central hub receiving opening 24 of FIG. 7.

In bending the tabs 26, 26 from their flat or blank position of FIG. 6 to the FIG. 7 position, an angle of approximately 90° is traversed and, preferably, the tabs are bent through an angle slightly less than 90° and in the range of 85°–90°. Thus, the tabs 26, 26 are inclined radially inwardly at a slight angle from their inner or connected end portions toward their outer or free end portions such that the maximum compressive force will be exerted by the tabs on the flexible hub member at their said free end portions. As best illustrated in FIG. 7, the inner surfaces of the tabs 32, 32 extend generally axially and face generally radially inwardly whereby to provide the aforementioned hub seating surfaces.

At the free end portions of the tabs 26, 26, there is preferably provided at least one sharp edge on each tab for firm compressive engagement with the flexible hub member 20. As shown, each tab 26 has an axially exposed free end surface which is concave when viewed axially toward the radial member 14, such concavity being inherent in the provision of the circular opening 28. Thus, each end surface 34 defines two sharp edges located respectively at its terminal portions. Such edges are indicated at 36, 36 and will be seen to lie along junctions between terminal portions of the surface 34 and axial tab side surfaces 38, 38. From the foregoing, it will be apparent that each of the sharp edges 36, 36, compressively engaged with and somewhat depressing the exterior surface of the flexible hub member 20, will serve in cooperation with the seating surface 32, 32 to positively retain the hub member within the central opening 24 in the radial member 14. Such compressive engagement of the edges 36, 36 serves not only to restrain the hub member axially but also contributes to the rotative connection between the hub member and the radial member 14 for torque transmission from a shaft such as 22 to the fluid moving blades 12, 12.

Figure 4:
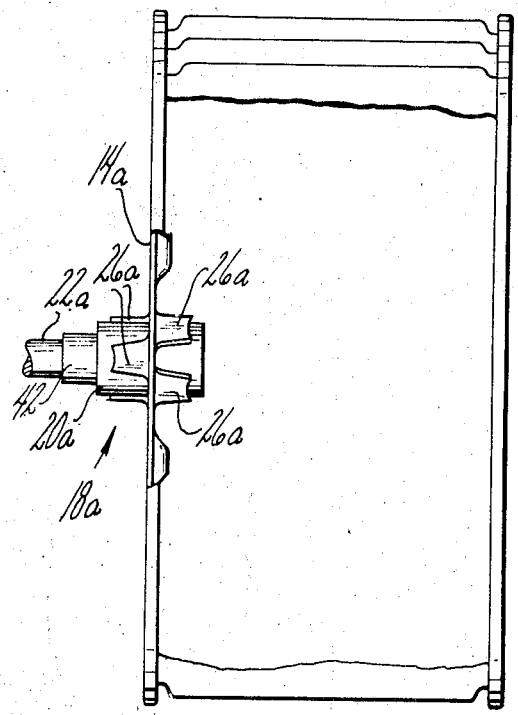
FIG. 4 is a front view of a blower wheel partially broken away to better illustrate a resilient hub assembly of the invention in an end plate of the wheel, the said hub assembly comprising a second embodiment of the invention.
Figure 5:
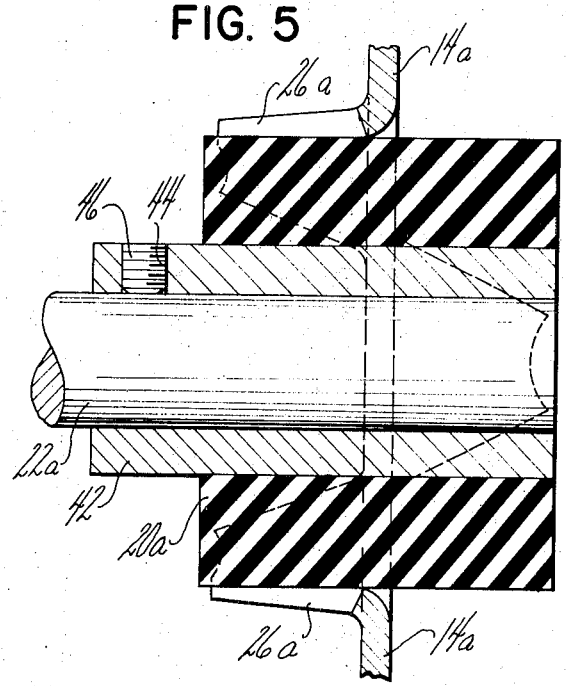
FIG. 5 is an enlarged section showing the hub assembly of FIG. 4.

Referring now particularly to FIGS. 4 and 5, it will be observed that a blower wheel 40 has an end plate or radial member 14a and an associated resilient hub assembly 18a. The hub assembly 18a may be identical with the hub assembly described above with respect to a flexible hub 20a, and tabs 26a, 26a. A shaft 22a is entered within the flexible hub 20a but is not in direct engagement therewith. Instead, there is interposed between the shaft 22a and the flexible hub 20a a second and rigid hub member 42. The hub member 42 is entered in the flexible hub member 20a and is in compressive engagement therewith for torque transmission thereto. The axial extent of the rigid hub member 42 is somewhat greater than that of the flexible hub member 20a and a positive shaft securing device is preferably provided in association with the hub member 42. Thus, a radially extending threaded opening 44 in the projecting portion of the hub member 42 is adapted to receive a conventional set screw 46 for positive retention of the hub member 42 on shaft 22a.

Certain advantages are derived with the interposition of the rigid hub member 42 between the flexible hub and the shaft 22a. Ease and convenience of assembly is enhanced and, in addition, a somewhat improved torque transmitting connection is obtained between the rigid hub member 42 and the flexible hub 20a. Compressive engagement between the rigid hub member 42 and the flexible hub member 28 may be effected under somewhat larger diameter conditions resulting in a higher torque transmitting capability of the hub assembly.

Figure 9:
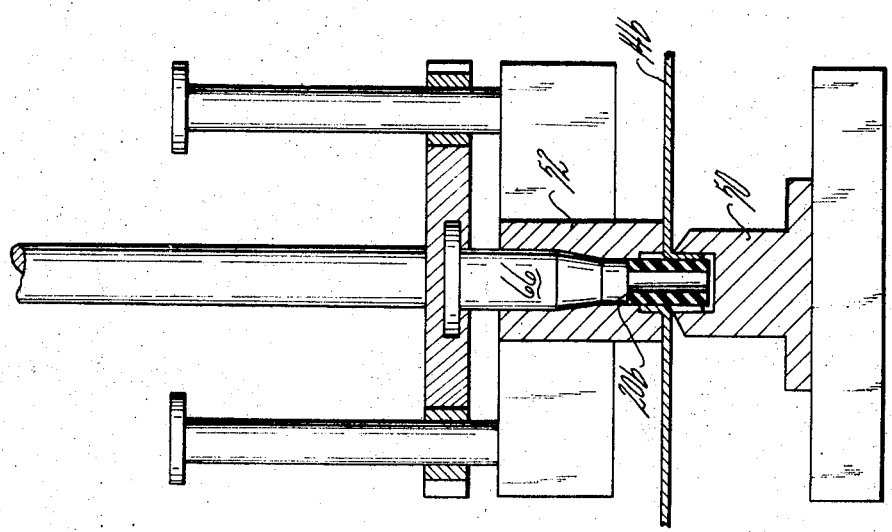
FIGS. 8 and 9 are schematic illustrations of a power operated press and press tools employed in practicing the aforementioned second aspect of the method of the invention.
Figure 8:
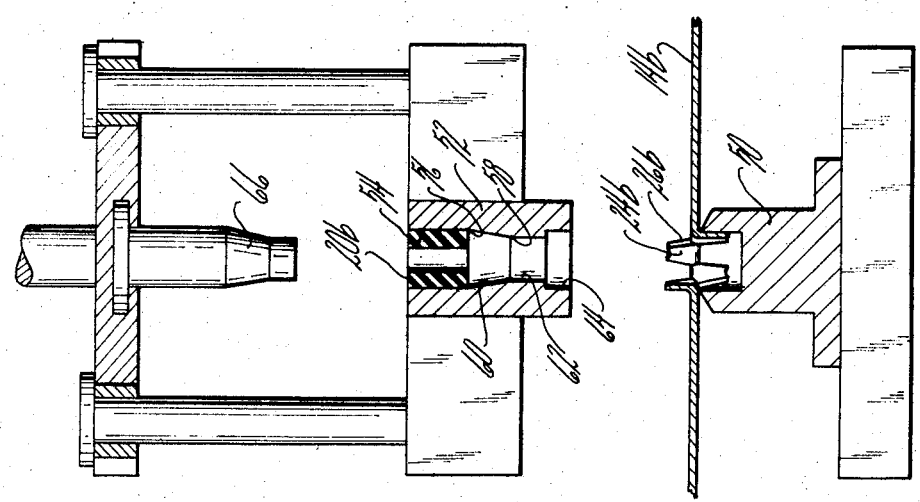

In accordance with a further aspect of the method of the present invention, the hub assemblies or FIGS. 1–3, or 4 and 5, can be readily constructed with the use of a hub compressing member having a reducing section of very low friction characteristics. In FIGS. 8 and 9, power operated presses and press tools are shown respectively in first and second conditions of operation. In FIG. 8, a radial member 14b is shown with a hub receiving opening 24b exposed for axial entry of a flexible hub member 20b. The hub receiving opening 24b is preferably provided with an axially extending hub seating means adjacent thereto and such seating means may take the form of axial tabs such as those described above at 26, 26a. A base or supporting tool 50 holds the radial member 14b in position for downward vertical entry of the flexible hub 20b.

A hub compressing member 52 supports the flexible hub member 20 in an entry section 54 which is shaped to allow the hub member to assume its free state or uncompressed condition. The compressing member 52 includes an entry opening 56 and an exit opening 58 and a reducing section 60 disposed therebetween. Further, a substantially straight wall exit section 62 adjacent the exit opening 58 is equal in diameter to said opening and terminates downwardly in a somewhat enlarged section 64. The enlarged section 64 is shaped to surround and provide lateral support for the seating means or tabs 26b, 26b as best illustrated in FIG. 9.

The wall of the reducing section 60 is of a material having a low coefficient of friction as mentioned above and, preferably, the coefficient of friction thereof is at least approximately equal to that of a fluorocarbonthermoplastic. Further, in the preferred embodiment as shown, the entire compressing member 52 is constructed of Teflon, (polytetrafluoroethylene—TFE, polychlorofluoroethylene—CFE, or fluoronated ethylene-propylene—FEP).

A plunger 66 disposed vertically above the compressing member 52 is movable downwardly therewith and independently thereof as illustrated in FIG. 9. Thus, the compressing member 52 can be moved downwardly to dispose the section 64 about the tabs 26b, 26b for lateral support thereof, and the plunger 66 may thereafter be urged downwardly into engagement with the flexible hub member 20b. On further movement of the plunger 66 downwardly within the entry section 54, the reducing section 60 and the exit section 62, the flexible hub member 20b, will be compressed radially in passage through the reducing section 60 and will be efficiently urged into its operative position in assembly with the radial member 14b.

With the use of a reducing section 60 having a wall of Teflon or the like, it is found that former difficulties in compressing flexible material such as rubber are effectively overcome. Thus, it is not necessary to rotate the hub member 20b during passage through the reducing section 60, the exit section 62 and into the opening 24b and, once compressed in the section 60, the hub member is found to move efficiently into operative position in the radial member 14b.

What is claimed is:

1. A rotary fluid moving device comprising a plurality of circumaxially arranged fluid moving blades, at least one generally radially extending axially thin member connected at radially outwardly located portions with said fluid moving blades and adapted at a radially inwardly located area for connection with a flexible hub member, said inwardly located area comprising a plurality of circumaxially arranged tabs integral with the radial member but bent alternately in one and an opposite axial direction from the plane thereof to extend generally axially outwardly therefrom about a central opening in said radial member to provide generally radially inwardly facing and generally axially extending hub seating surfaces, said plurality of tabs comprising at least two tabs extending in said one axial direction from said radial member and arranged on generally opposite sides of said central opening in the member and at least two other tabs extending in said other axial direction from said radial member and arranged on generally opposite sides of said central opening in the member, each of said tabs having two generally axially extending side surfaces and a concave axially outwardly opening end surface extending between said side surfaces and having terminal portions which join said side surfaces to define two sharp edges, and a flexible hub member having a radial dimension greater than that of said central opening and an axial dimension substantially greater than that of said radial member, said hub member being disposed within said central opening in said radial member in engagement with and under compression by said seating surfaces and said sharp edges of said tabs for torque transmitting retention in said opening.

2. A rotary fluid moving device as set forth in claim 1 wherein a second and rigid hub member is provided and is disposed in compressive engagement within the flexible hub member, said second hub member being provided with an axial shaft receiving opening and a positive shaft securing device.

3. A rotary fluid moving device as set forth in claim 2 wherein said second hub member has a substantially greater axial dimension than said flexible hub member so as to project axially therefrom, and wherein said positive shaft securing device comprises a threaded radial opening in said projecting portion of said second hub member and a cooperating set screw.

4. A rotary fluid moving device as set forth in claim 1 wherein said plurality of tabs comprises three tabs extending in each axial direction from said radial member.

References Cited

UNITED STATES PATENTS

| | | | |
|---|---|---|---|
| 2,111,245 | 3/1938 | Irgens | 64—30DX |
| 2,140,441 | 12/1938 | Clark | 248—56X |
| 2,492,029 | 12/1949 | Beier | 170—160.54X |
| 2,702,087 | 2/1955 | Beier | 170—160.54X |
| 2,760,255 | 8/1956 | Compton | 170—156UX |
| 3,051,372 | 8/1962 | Rockafield et al. | 230—134.48 |

FOREIGN PATENTS

| | | | |
|---|---|---|---|
| 1,334,811 | 7/1963 | France | 64—27R |
| 1,342,647 | 9/1963 | France | 64—27R |

EVERETTE A. POWELL, Jr., Primary Examiner

U.S. Cl. X.R.

416—244